Figure 1:
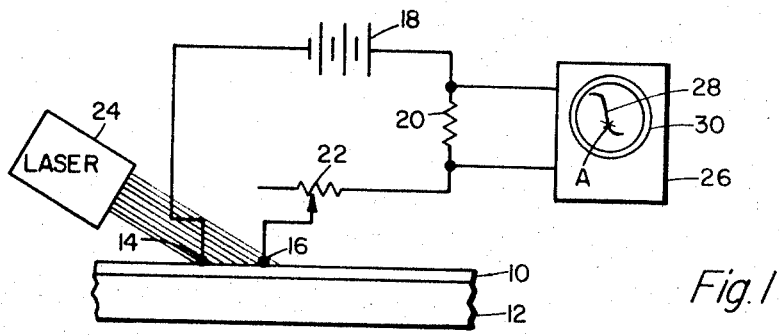

United States Patent [19]
Nikirk et al.

[11] 3,745,454
[45] July 10, 1973

[54] METHOD AND MEANS FOR MEASURING CARRIER LIFETIME IN EPITAXIAL FILMS

[75] Inventors: Roger G. Nikirk, Scottsdale; Leo C. Rogers, Phoenix, both of Ariz.

[73] Assignee: Motorola, Inc., Franklin Park, Ill.

[22] Filed: Dec. 3, 1971

[21] Appl. No.: 204,698

Related U.S. Application Data

[63] Continuation of Ser. No. 861,040, Sept. 25, 1969, abandoned.

[52] U.S. Cl............. 324/64, 324/62 R, 324/158 D, 324/158 P
[51] Int. Cl.......................................... G01r 27/14
[58] Field of Search.................. 324/62, 64, 158 D, 324/158 P; 331/94.5

[56] References Cited
UNITED STATES PATENTS

| | | | |
|---|---|---|---|
| 2,677,106 | 4/1954 | Haynes et al. | 324/158 |
| 2,805,347 | 9/1957 | Haynes et al. | 324/158 X |
| 3,229,200 | 1/1966 | Rayburn | 324/62 |
| 3,312,893 | 4/1967 | Currin et al. | 324/64 |
| 3,466,539 | 9/1967 | Pitts et al. | 324/62 |
| 3,495,170 | 2/1970 | Biard et al. | 324/62 |

OTHER PUBLICATIONS

Clarke et al., I.R.E. Standards On Measurement of Minority-Carrier Lifetime, Proceedings of IRE, Vol. Y9, Aug. 1961, pp. 1292-1299, TK5700.17

Winogradoff, Radiative Recombination Lifetimes in Laser Excited Silicon, Applied Physics Letters, Vol. 8, No. 4, 2/15/66 pp. 99-101

Tulk, Resistivity*Lifetime Measurements *, Semiconductor Products, Oct. 1960, Vol. 3, No. 10, TK 7800 S4, pp. 27-30.

*Primary Examiner*—Stanley T. Krawczewicz
*Attorney*—Mueller & Aichele

[57] ABSTRACT

To measure the lifetime of carriers in epitaxial film, contacts are made to the film by probes which are spaced from each other. A voltage is applied between the probes, and a light pulse is directed onto the film between the probes. The length of time that it takes the current flow through the layer between the probes to decay to a value of $1/e$ of the maximum value thereof after the end of the light pulse is a measure of the lifetime of the carriers in the layer.

6 Claims, 4 Drawing Figures

PATENTED JUL 10 1973 3,745,454

INVENTOR.
Roger G. Nikirk
Leo C. Rogers
BY
Mueller, Aichele & Rauner
ATTY'S.

METHOD AND MEANS FOR MEASURING CARRIER LIFETIME IN EPITAXIAL FILMS

This is a continuation, of application, Ser. No. 861,040, filed Sept. 25, 1969 now abandoned.

BACKGROUND

As at present known, there is no method or means for measuring the lifetime of carriers in an epitaxial film. When measuring the carrier lifetime in crystals, the crystal is prepared for measurement by cutting flat faces on each end thereof and a contact is provided thereon by applying a silver solution on the flat faces at the ends of the crystals. Also the surface of the crystal away from the ends is vapor honed to allow the light which is applied to the crystal to act on the crystal in such a manner as to release carriers. The variation in applying contacts to the ends of the crystal and in the vapor honing of the crystal may cause great variations in the results obtained in measuring the carrier lifetime. A variation of as much as 280 percent in lifetime measurements, which result from such variations, is acceptable. The current supply is allowed to find its own level at about 6 to 10 milliamperes, and a beam of light which has many wave lengths and which has relatively high divergence is applied to the crystal to produce the carriers. The fall time of the light pulse from the source may be 20 to 40 microseconds. Since the lifetime of the carriers in the crystal may be long compared to the fall time of the light pulse, such a long fall time is not detrimental to the measurement of the lifetime of the carriers in crystals. However, in measuring the lifetime of carriers in epitaxial layers, such a known method cannot be used since measurements are not made between parallel ends of crystal and since the current intensity used must not affect the epitaxial layer and since the carrier lifetime is so short that the fall time of a particular light may be longer than the lifetime of the carriers whereby the fall time makes the measurement impossible using such a light. Furthermore, use of a beam of white light, in which many wavelengths of light are applied at the same time produces readings dependent on other properties of the crystal which are a function of the various thousands of wave lengths in white light but not necessarily on the life time of the carriers in the crystal.

It is an object of this invention to provide a method and a means to measure carrier lifetime in epitaxial layers.

SUMMARY

In accordance with this invention, the contact ends of spaced insulated probes are applied to the epitaxial layer at a pressure intermediate a predetermined maximum and minimum pressure, a voltage is applied between the probes having a value such that while enough current flows through the epitaxial layer to provide repeatable measurements, the current flow does not injure the layer, and a laser device which provides high intensity pulses of light in a substantially nondivergent beam and of a single wavelength, the pulses having a very short fall time, is directed on the area of the epitaxial layer between the probes to produce the carriers whose lifetime is to be measured. The flow of current through the layer is applied to an oscillograph which provides an indication of the current flow through the layer. The time it takes the current to decay after a pulse has ended is plotted against time. The time that it takes the current to decay from its maximum to a value equal to $1/e$ of the maximum is the lifetime of the carriers.

DESCRIPTION

Figure 2:
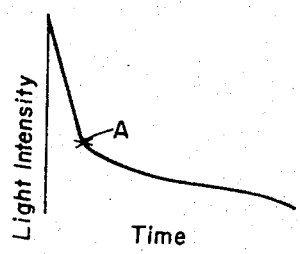
Figure 3:
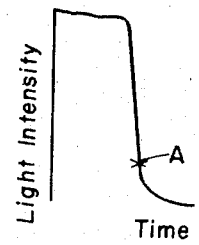
Figure 4:
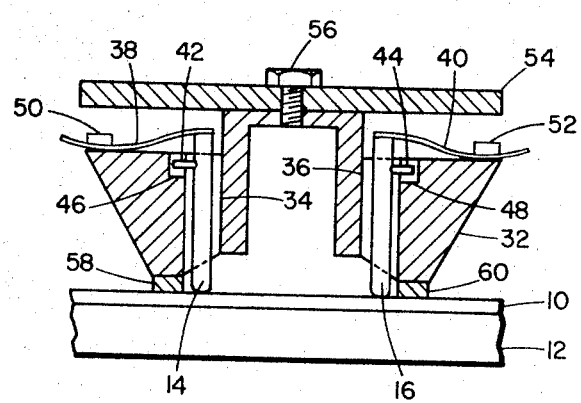

The invention will be better understood upon reading the following description in connection with the accompanying drawing in which FIG. 1 illustrates diagrammatically a method and apparatus for measuring the lifetime of carriers in an epitaxial layer according to this invention, FIGS. 2 and 3 are curves useful in explaining the here disclosed invention and FIG. 4 illustrates one type of contacts or probes that may be used in the circuit of FIG. 1.

Turning first to FIG. 1, an epitaxial layer or film 10 has been deposited in a known manner on a single crystal substrate 12, and the lifetime of the carrier in the film or layer 10 is to be measured. A pair of probes 14 and 16 having rounded contacting tips are applied at a predetermined pressure and at spaced points thereon to the layer 10. The predetermined contact pressure may be provided by a structure such as that of FIG. 4 which will be described. The contact pressure must be sufficiently high so that good contact is provided and yet not so high as to cause damage to the film 10 by the ends of the probes 14 and 16. The probes 14 and 16 are connected together through a series circuit which includes a voltage source such as a battery 18, an output resistor 20 and a variable resistor 22 connected in series. The voltage of the battery 18 and the values of the resistors 20 and 22 as well as the distance between the contacts 14 and 16 is so chosen that the maximum current flow through the film 10 is about one milliampere. However, the value, specifically, is optimized for each structure of epituxual layer and substrate combination that is tested. The current flow must be sufficiently high that good measurements result, and yet not so high that the heat caused by the flow of current through the film 10 damages the film. A laser is directed on the surface of the film 10 in the area between the contacts 14 and 16, the laser beam being only slightly divergent and comprising light of one wavelength such as about nine-tenths of a micron long. The energy of this beam of this wavelength will be absorbed by the epitaxial layer 10. The beam has slightly more energy than that required to cause a transition of the electrons in the silicon comprising the epitaxial layer to the conduction band from the valence band. Shorter wavelengths of light will be reflected upon the surface and longer wavelengths of light may not have sufficient energy to excite the electrons. The pulses of light produced by the laser 24 has a fall time, that is the time that the light decays from its maximum value to a value equal to $1/e$ of the maximum value, of one to two microseconds. An oscilloscope 26 is connected across the output resistor 20. The time that it takes for the trace 28 on the face 30 of the oscilloscope 26 to go from the top point of the trace 28 to a point down the trace where its value is equal to $1/e$ times the peak value is a measure of the lifetime of the carriers in the epitaxial layer 10.

In the operation of the circuit of FIG. 1, light pulses from the laser 24, in reacting with the surface of the epitaxial layer 10 causes electrons of the material of this layer 10 to be energized to the point whereby they become conductive electrons. The resistance of the circuit between the probes 14 and 16 decreases while the light from the laser 24 illuminates the surface of the film and the top of the trace 28 shows the current flow through the film. As noted above, the resistor 22 is adjusted so that the maximum current flowing through the film is about one milliampere. After the light produced by the lasser has ceased, current keeps flowing in the film 10 due to the fact that the conductive electrons produced by the light take time to throw off their energy and descend into their valence band where conductivity of the film ceases.

However, the light at the end of a pulse does not end instantaneously but becomes less intense very rapidly at first to a point such as A of FIG. 2 and then decreases in intensity at a lesser rate and becomes zero at a much later time. Since the decrease is gradual after the point A is reached, the measurement is taken at the point where the current has decreased to a value of $1/e$ of its maximum value, this point being at or near the end of the rapid decrease in illumination as the pulse extinguishes.

As the light of the pulse, in the process of ceasing, decreases in intensity, the number of conductive electrons produced by the light beam decreases in number also. After the light ceases entirely, no new conductive electrons are produced, however the conductive electrons produced by the light takes time to descend to their valence state during which time they conduct, whereby the shape of the decreasing portion of the pulse 28 is caused both by the finite time it takes the applied light to extinguish completely and also by the finite time that it takes the conductive electrons to become valence electrons. FIG. 2 is a plot of the intensity of light of a known light source plotted against time. In FIG. 2, as the light produced extinguishes, light intensity decreases fairly rapidly from its maximum to the point A and much slower beyond the point A. If the lifetime of the conductive electrons is short with respect to the decay time of the light to the point A, the light source having the light decay properties of FIG. 2 will present a curve such as 28 of FIG. 1 in which the time delay from the peak to the point A is mainly due to the time it takes the light to extinguish and only to a very minor extent to the lifetime of the carriers, whereby when using a light such as that which produces the curve of FIG. 2, the curve 28 of FIG. 1 gives very inaccurate results if the lifetime of the carriers that is to be measured is short. The curve of FIG. 3 is a plot of the intensity of light plotted against time for a laser such as 24 of FIG. 1. In FIG. 3, the trailing end of the curve from the high point thereof to the point A is very steep. Therefore the delay indicated by the trailing edge of the curve 28 down to the point A when a laser 24 is used as a light source is to a great extent due to the lifetime of the carriers and only to a minor extent due to the time it takes the light which hits the epitaxial surface 10 between the probes 14 and 16 to decay to the point A of FIG. 3. The use of a laser in the method and apparatus of FIG. 1 therefor presents the advantages that there is no varying effect on the film due to the many wave lengths in white light, most of the light produced causes energization of the electrons in the epitaxial layer 10, and the delay indicated by the trailing edge of the curve 28 of FIG. 1 is mainly due to the effect that is being measured, that is, due to the lifetime of the carriers and only to a minor extent due to the time that it takes the light to decay.

The probes 14 and 16 may be mounted as shown in FIG. 4 to assure that the pressure applied thereby to a film is that which is desired. In FIGS. 1 and 4, the same reference characters have been given similar elements. A body member 32 of insulating material has a pair of holes therein, 34 and 36. The probes 14 and 16 are slideable in the holes 34 and 36 respectively and they are urged, downwardly as viewed in FIG. 4 by respective leaf springs 38 and 40. The probes 14 and 16 have respective stops 42 and 44 projecting therefrom and cooperating with the slots 46 and 48 in the body member 32 to prevent the probes 14 and 16 from falling out of the body portion 32. The springs 38 and 40 are held in place in the body portion 32 by respective blocks 50 and 52 and respective wires are connected to the springs 38 and 40 and therefor to the probes 14 and 16 for connection in the circuit of FIG. 1. The top plate 54 of the body portion 32 may be fixed in place as by a screw 56. The bottom of the body portion 32 has pads 58 and 60 made of a soft resilient material such as nylon fixed at the bottom thereof. The body 32 is skeletonized as much as possible as shown in FIG. 4 to permit light to hit the epitaxial area 10 between the probes 14 and 16. The springs 38 and 40 are so weak that the weight of the body portion 32 including the top 54 causes the lower ends of the pins 14 and 16 to be flush with the bottoms of the pads 56 and 58 when the body 32 is laid on a surface, whereby the pressure applied to the epitaxial layer 10 by the probes 14 and 16 is determined not by the weight of the body portion 32 plus the weight of the top 54 but by the stiffness of the springs 38 and 40. Therefore, using a probe holder such as that of FIG. 4, the pressure applied to the epitaxial layer 10 by the probes 14 and 16 can be set at a desired value, as by choice of the stiffness of the springs 38 and 40, and this pressure is reproducible from test to test.

What is claimed is:

1. The steps in the method of determining the lifetime of carriers in an epitaxial film which comprises:
    pressing a pair of electrically conductive probes against the same side of said film at predetermined spaced points thereof,
    applying a predetermined voltage between said probes,
    directing a pulse of light of one wavelength on said film in the vicinity of and between said probes, said wavelength being selected such that energy of said pulse of light is absorbed by said epitaxial film, and;
    indicating the time duration of the flow of current between said probes after the end of said pulse of light.

2. The invention of claim 1 in which the pressure which is applied to said film by said probes is sufficiently great to provide good contact therebetween but without substantially distorting said film.

3. The invention of claim 1 in which the voltage which is applied between said probes is chosen to be sufficiently great so that a good indication is produced and yet not sufficiently great to damage said film by heating.

4. The invention of claim 1 in which light pulses having a wavelength of substantially nine-tenths micron from a laser are directed on said epitaxial layer and said predetermined voltage causes maximum current of substantially one milliampere to flow during said pulse of light.

5. Apparatus for measuring the lifetime of carriers in an epitaxial layer which comprises:
   a pair of conductive probes for contact with one side of said epitaxial layer,
   a body having holes in which said probes are slideably mounted,
   spring means tending to slide at least an end portion of said probes out of said body with a predetermined force,
   a circuit connecting said probes, said circuit including a source of voltage and a current limiting means and an output means in series between said probes,
   means for indicating the current flow in said output means and,
   a light pulse producing laser for illuminating the portion of said film which is contacted by said probes.

6. Apparatus according to claim 5 wherein the weight of said body is greater than said predetermined force.

* * * * *